United States Patent
Katou

(10) Patent No.: US 6,999,861 B2
(45) Date of Patent: Feb. 14, 2006

(54) TIRE STATUS MONITORING APPARATUS AND RECEIVER THEREFOR

(75) Inventor: Michiya Katou, Ichinomiya (JP)

(73) Assignee: Pacific Industrial Co., Ltd., Gifu-ken (JP)

( * ) Notice: Subject to any disclaimer, the term of this patent is extended or adjusted under 35 U.S.C. 154(b) by 131 days.

(21) Appl. No.: 10/686,109

(22) Filed: Oct. 15, 2003

(65) Prior Publication Data

US 2004/0193341 A1    Sep. 30, 2004

(30) Foreign Application Priority Data

Mar. 28, 2003   (JP)   ............................. 2003-091993

(51) Int. Cl.
G06F 7/00     (2006.01)
G01S 5/04     (2006.01)
B60C 23/02    (2006.01)

(52) U.S. Cl. .............................. 701/29; 701/31; 701/32; 73/146.2; 73/146.4; 340/442; 340/445; 340/426.16; 116/34 R

(58) Field of Classification Search .................... 701/1, 701/29, 31–35; 340/438, 440, 442, 426.15, 340/426.16, 426.33, 443, 446, 447, 505, 340/10.1, 10.33, 426.13, 426.14, 42; 73/146, 73/146.2, 146.3, 146.4, 146.5; 235/435–438; 116/34 R, 28 R, 28.1, 34 A, 34 B; 200/61.22, 200/61.25
See application file for complete search history.

(56) References Cited

U.S. PATENT DOCUMENTS

| | | | | |
|---|---|---|---|---|
| 5,612,671 A | | 3/1997 | Mendez et al. ............. | 340/447 |
| 6,292,096 B1 | * | 9/2001 | Munch et al. .............. | 340/445 |
| 6,441,728 B1 | * | 8/2002 | Dixit et al. ................. | 340/447 |
| 6,446,502 B1 | * | 9/2002 | Normann et al. .......... | 73/146.5 |
| 6,630,885 B1 | * | 10/2003 | Hardman et al. .......... | 340/505 |
| 6,737,965 B1 | * | 5/2004 | Okubo ........................ | 340/445 |
| 6,750,761 B1 | * | 6/2004 | Newman .................... | 340/442 |
| 6,753,767 B1 | * | 6/2004 | Lin et al. .................... | 340/442 |
| 6,771,169 B1 | * | 8/2004 | Kaminski et al. .......... | 340/442 |
| 6,809,638 B1 | * | 10/2004 | Lin ............................. | 340/447 |
| 2002/0196137 A1 | | 12/2002 | Poirier et al. .............. | 340/442 |
| 2003/0145650 A1 | * | 8/2003 | Juzswik et al. ............. | 73/146 |

FOREIGN PATENT DOCUMENTS

| EP | 0 982 159 A2 | 3/2000 |
|---|---|---|
| EP | 1 197 356 A2 | 4/2002 |
| JP | 2000-103209 A | 4/2000 |

\* cited by examiner

Primary Examiner—Jacques H. Louis-Jacques
(74) Attorney, Agent, or Firm—Crompton, Seager & Tufte, LLC

(57) ABSTRACT

A receiver of a tire status monitoring apparatus which can specify tire mounting positions and does not require initial registration work. The tire status monitoring apparatus includes a plurality of transmitters which are provided on the respective tires of a vehicle and transmit data indicating statuses of the respective tires. The data includes an identification code to identify each tire, and the receiver is supplied with an activation signal to activate a drive source of the vehicle. The receiver includes a reception unit which receives the data from the transmitters, and a control circuit which is connected to the reception unit and collates the identification code included in the data upon detection of the activation signal and specifies, based on the identification code, each transmitter which has transmitted the data.

12 Claims, 3 Drawing Sheets

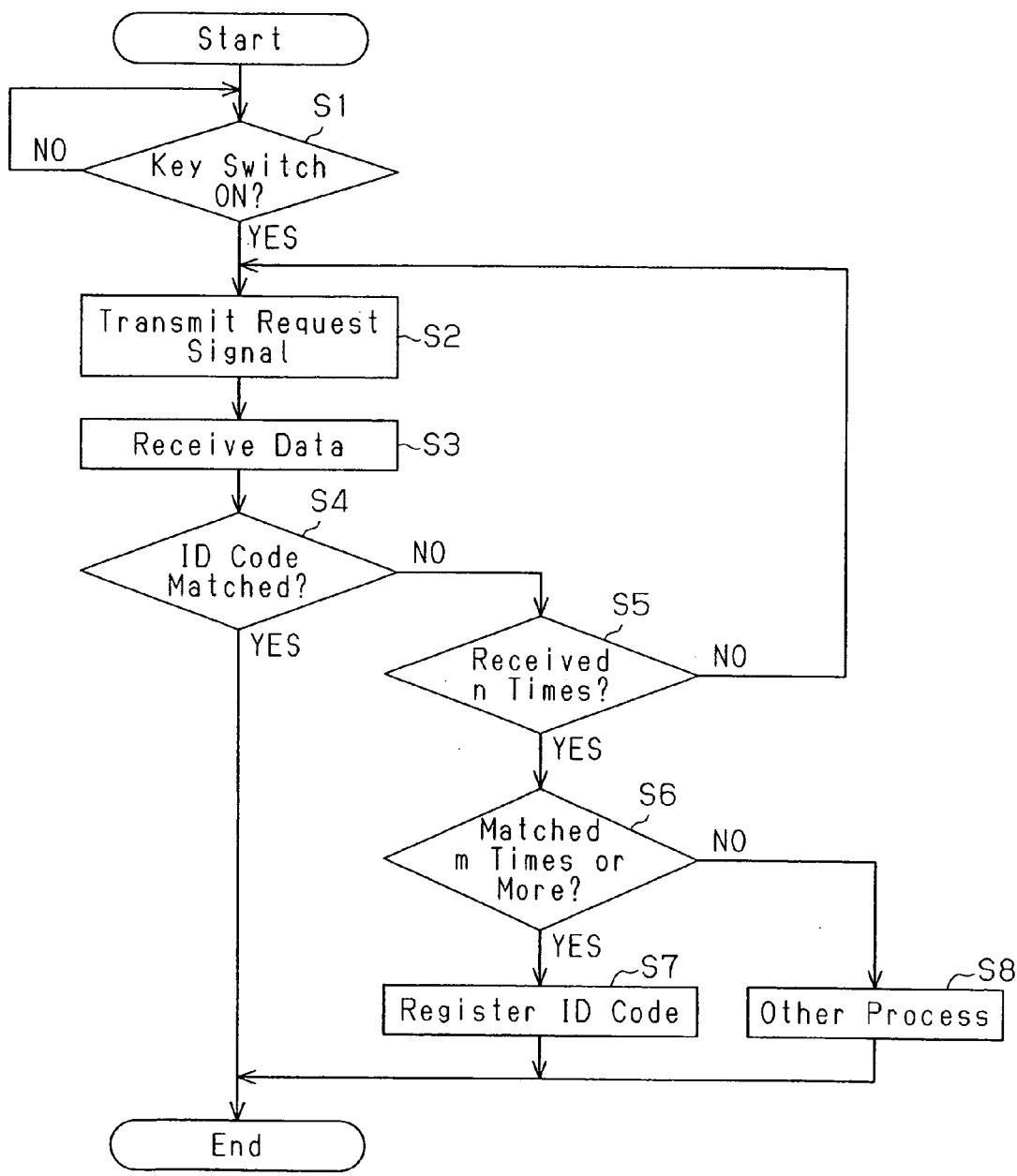

TIRE STATUS MONITORING APPARATUS AND RECEIVER THEREFOR

BACKGROUND OF THE INVENTION

The present invention relates to a wireless type tire status monitoring apparatus capable of checking the status of a tire, such as tire air pressure while the driver remains in the vehicle, and a receiver for such a tire status monitoring apparatus. More particularly, this invention relates to a tire status monitoring apparatus and a receiver for the tire status monitoring apparatus which specifies which one of transmitters provided on a plurality of tires is a data sender.

Conventionally, a wireless type tire status monitoring apparatus has been used to enable the driver check the statuses of a plurality of tires provided on a vehicle while the driver remains inside the vehicle passenger compartment. Attached to the tires are respective transmitters which measure the air pressure statuses of the associated tires and transmit data by radio indicative of the measured statuses of the tires. The body of the vehicle is provided with a receiver which receives transmitted data from each transmitter.

Each transmitter sends data indicating the status of the associated tire to a single receiver. The receiver should discriminate from which one of the transmitters on the tires has transmitted the data that was received. Therefore, each transmitter is assigned with an inherent ID code. Each transmitter transmits data indicating the status of the associated tire together with the ID code. Based on the ID code, therefore, the receiver can identify the transmitter which is the sender of the data (see Japanese Patent Laid-Open Publication No. 2000-103209).

To allow the receiver to identify the transmitter which is the sender of data, however, the ID codes of the transmitters in the associated tires provided on the vehicle should be registered in the receiver beforehand. What is more, at the time of initial registration, it is necessary to associate the ID codes with the mounting positions of the tires to which the transmitters having the ID codes are respectively mounted. When new tires are mounted on a vehicle or the mounting positions of the tires with respect to the vehicle are changed, therefore, initial registration should always be performed. Such initial registration involving manual work is difficult and takes time.

SUMMARY OF THE INVENTION

One aspect of the present invention is a receiver for a tire status monitoring apparatus that monitors statuses of a plurality of tires provided on a vehicle. The tire status monitoring apparatus includes a plurality of transmitters, provided on the tires respectively, for transmitting data indicating statuses of the respective tires. The data includes an identification code to identify each tire. The receiver is supplied with an activation signal to activate a drive source of the vehicle. The receiver includes a reception unit which receives the data from the transmitters. A control circuit is connected to the reception unit. Upon detection of the activation signal, the control circuit collates the identification code included in the data and specifies, based on the identification code, each transmitter which has transmitted the data.

Another aspect of the present invention is a tire status monitoring apparatus for monitoring statuses of a plurality of tires provided on a vehicle. The tire status monitoring apparatus includes a plurality of transmitters provided on the tires respectively, which detect statuses of the associated tires and transmit data indicating the detected statuses of the tires. The data includes an identification code to identify each tire. A receiver is provided on the vehicle. The receiver receives the data from the plurality of transmitters and is supplied with an activation signal for activating a drive source of the vehicle. The receiver includes a control circuit. Upon detection of the activation signal, the control circuit collates the identification code included in the data and specifies, based on the identification code, each transmitter which has transmitted the data.

Another aspect of the present invention is a method of monitoring statuses of a plurality of tires provided on a vehicle. The tires include a plurality of transmitters which generate data indicating statuses of the respective tires. The vehicle includes a receiver which receives the data from the transmitters. The data includes an identification code to identify each tire. The method includes detecting an activation signal for activating a drive source of the vehicle, transmitting a request signal for generating the data and transmitting the data to the receiver to the plurality of transmitters, when the activation signal is detected, receiving the data from the plurality of transmitters, collating the identification code included in the data, and specifying each transmitter which has transmitted the data, based on the identification code.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4 is a flowchart illustrating the operation of the transceiver in FIG. 3.

DETAILED DESCRIPTION OF THE PREFERRED EMBODIMENTS

Figure 1:
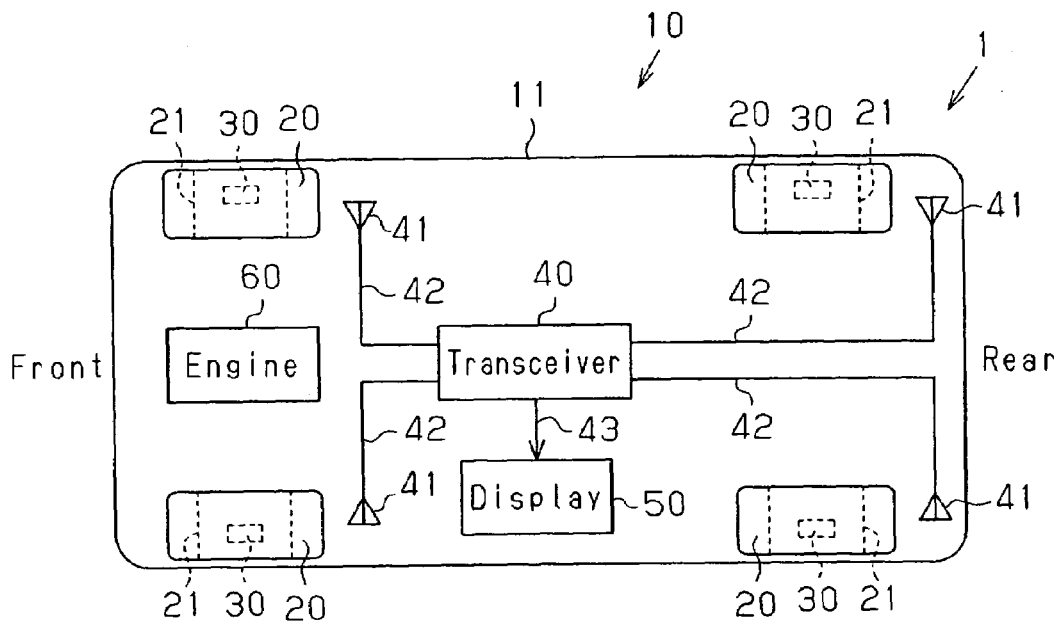
FIG. 1 is a schematic structural diagram of a tire status monitoring apparatus according to one embodiment of the present invention.

FIG. 1 is a schematic structural diagram of a vehicle 10 including a tire status monitoring apparatus 1 according to one embodiment of the present invention. As shown in FIG. 1, the tire status monitoring apparatus 1 includes four transponders (transmitters) 30 provided on respective tires 20 of the vehicle 10 and a single transceiver (receiver for the tire status monitoring apparatus) 40 provided on the body 11 of the vehicle 10.

Each transponder 30 is fixed inside the associated tire 20, e.g., on the wheel 21 of the tire 20. Each transponder 30 measures the status of the associated tire 20, i.e., air pressure in the associated tire 20, and transmits transponder data including air pressure data acquired by the measurement. The transponder data is wirelessly transmitted to the transceiver 40 from each transponder 30.

The transceiver 40 is provided at a predetermined location of the body 11 and operates on power from, for example, the battery (not shown) of the vehicle 10. The transceiver 40 has four antennae (reception units) 41 respectively corresponding to the four transponders 30. Each antenna 41 is connected to the transceiver 40 via a cable 42. The transceiver 40 generates a request signal at a predetermined time interval and transmits the request signal from each antenna 41. Each transponder 30 generates induced power based on the request signal and transmits transponder data using the induced power. The transceiver 40 receives the transponder data transmitted from each transponder 30 mainly via the associated antenna 41.

A display 50 is placed in a visible range of the driver of the vehicle 10, such as in the passenger compartment. The display 50 is connected to the transceiver 40 via a cable 43. An engine 60 or the drive source of the vehicle 10 is mounted in the front portion of the vehicle 10.

Figure 2:
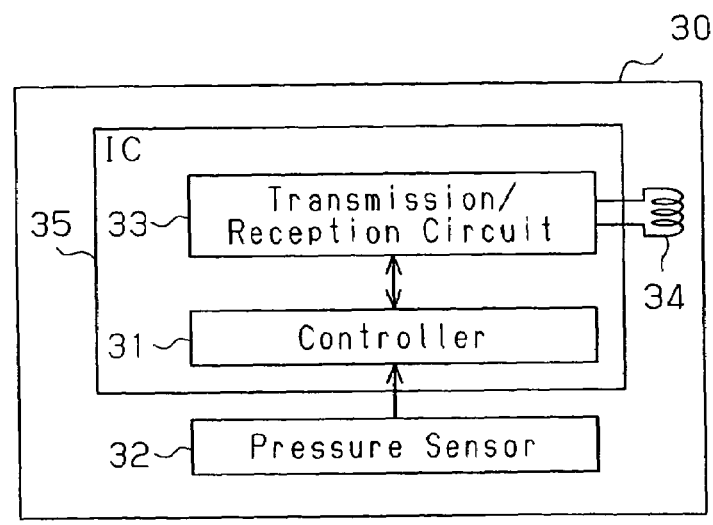
FIG. 2 is a schematic block diagram of a transponder of the tire status monitoring apparatus in FIG. 1.

As shown in FIG. 2, each transponder 30 includes a controller 31, a pressure sensor 32, a transmission/reception circuit 33 and a coil antenna 34. The controller 31 is, for example, a microcomputer including a CPU (Central Processing Unit), ROM (Read Only Memory) and RAM (Random Access Memory). Inherent ID codes are registered beforehand in the ROM. The ID codes are used to identify the four transponders 30 provided on the vehicle 10.

The pressure sensor 32 measures the air pressure in the tire 20 and supplies the controller 31 with air pressure data acquired by the measurement. The controller 31 generates transponder data including the air pressure data and the ID code registered in the internal memory, and supplies the transmission/reception circuit 33 with the transponder data.

The transmission/reception circuit 33 encodes and modulates the transponder data, then transmits the encoded and modulated transponder data via the coil antenna 34. The coil antenna 34 generates induced power based on, for example, the request signal sent from the associated antenna 41.

The transmission/reception circuit 33 supplies the induced power to the controller 31. The controller 31 controls the transponder 30 with the supplied induced power. That is, the transponder 30 operates on the power induced in the coil antenna 34. The controller 31 and the transmission/reception circuit 33 are formed on a single-chip semiconductor substrate and integrated into an IC 35.

Figure 3:
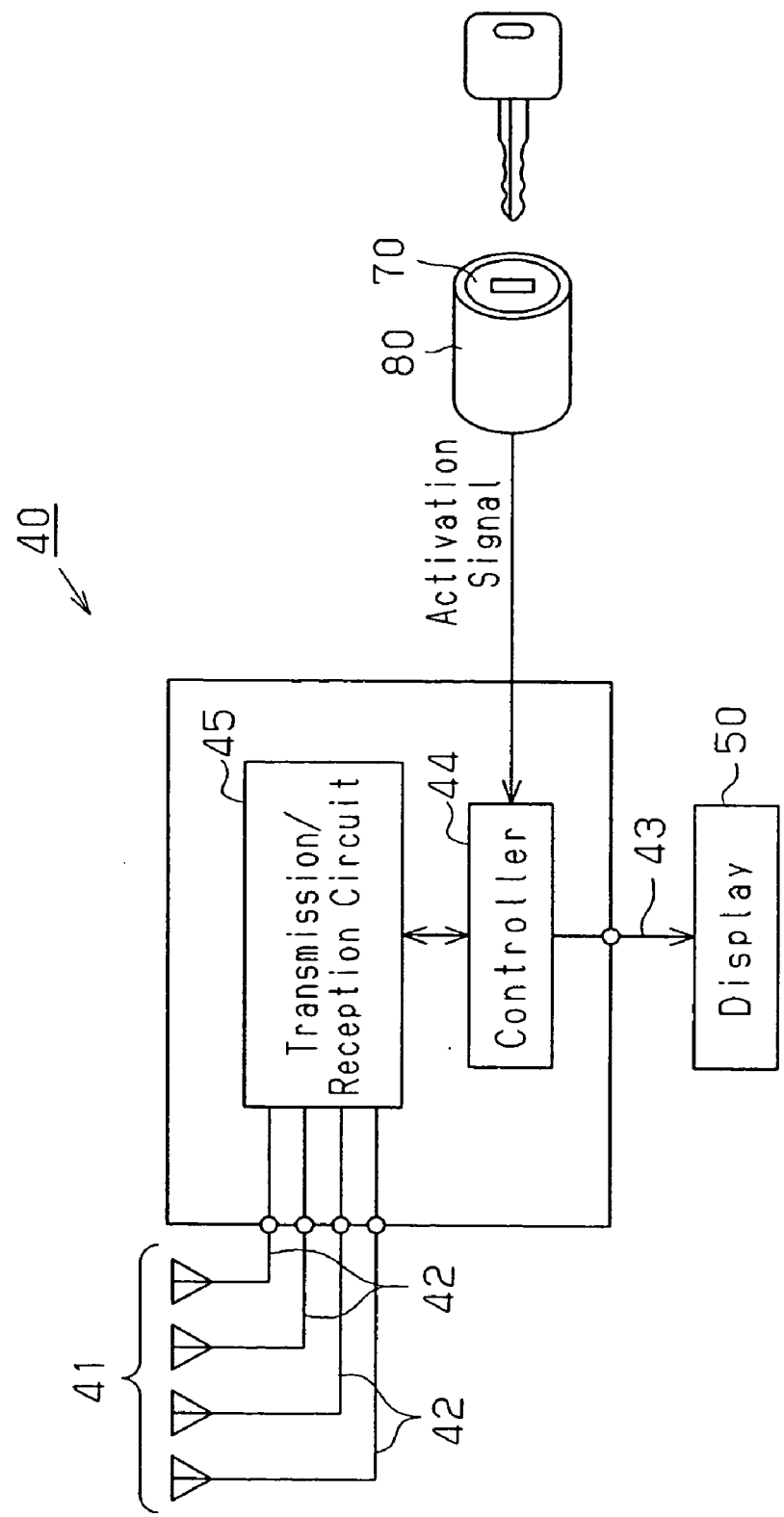
FIG. 3 is a schematic block diagram of a transceiver of the tire status monitoring apparatus in FIG. 1.

As shown in FIG. 3, the transceiver 40 includes a controller 44 which processes transponder data received via the antenna 41 and a transmission/reception circuit 45. The controller 44 is, for example, a microcomputer including a CPU, ROM and RAM. Inherent ID codes are registered in an internal memory, e.g., RAM, of the controller 44.

The transmission/reception circuit (reception unit) 45 receives the transponder data from each transponder 30 mainly via the associated antenna 41. The transmission/reception circuit 45 demodulates and decodes the encoded and modulated transponder data, and then supplies the resultant transponder data to the controller 44.

Based on the received transponder data, the controller 44 determines the air pressure of the tire 20 associated with the sender transponder 30. The controller 44 displays data about the air pressure on the display 50. In the case where the air pressure is particularly abnormal, warning of the event is displayed on the display 50. Further, the controller 44 receives from a key cylinder 80 a signal (activation signal) indicating the ON action of a key switch 70 which activates the drive source of the vehicle 10, e.g., the engine 60. In addition, the controller 44 stores an inherent ID code included in transponder data into its own internal memory, e.g., RAM, when a predetermined condition is met. Therefore, an inherent ID code indicating the sender transponder 30 is registered in the internal memory of the controller 44.

The controller 44 transmits a request signal to the transmission/reception circuit 45 from the antenna 41 at a predetermined time interval. Based on the request signal, induced power is generated in the coil antenna 34 of the transponder 30. The pressure sensor 32 measures air pressure in the tire 20 using that power. The transponder 30 transmits transponder data including air pressure data via the coil antenna 34. The transceiver 40 receives the transponder data transmitted from each transponder 30 mainly via the associated antenna 41.

The operation of the transceiver 40, specifically, the controller 44 of the transceiver 40, will be described next referring to the flowchart shown in FIG. 4.

First, the controller 44 determines if the key switch 70 which activates the engine 60 is turned on by the driver (S1). Specifically, the controller 44 determines if the activation signal from the key cylinder 80, originated from the ON action of the key switch 70, has been detected. When it is determined that the key switch 70 has been set to on (YES in S1), the transceiver 40 generates a request signal and sequentially transmits the request signal from the individual antennae 41 (S2). Then, induced power is generated in the coil antenna 34 of the transponder 30 corresponding to each antenna 41. With the induced power, the pressure sensor 32 of the transponder 30 measures air pressure inside the associated tire. The transponder 30 transmits transponder data including the measured air pressure data via the coil antenna 34.

The transceiver 40 receives the transponder data, sent from the transponder 30, via the associated antenna 41 (S3). The controller 44 determines whether the ID code included in the received transponder data (hereinafter called a transponder ID code) matches with an ID code registered in the internal memory of the controller 44 (hereinafter called a registered ID code) (S4). In the case where the transponder ID code matches with the registered ID code (YES in S4), the transceiver 40 terminates the process.

In the case where the transponder ID code does not match with the registered ID code (NO in S4), on the other hand, the controller 44 determines if the transponder data has been received by a first predetermined number of times (e.g., n times) (S5). In the case where the number of receptions of the transponder data has not reached the first predetermined number (NO in S5), the controller 44 returns to the process of step S2 and transmits the request signal.

In the case where the number of receptions of the transponder data has reached the first predetermined number (YES in S5) and the transponder ID codes received by the first predetermined number of times match with one another a second predetermined number of times or more (e.g., m times where m≦n) (YES in S6), on the other hand, the controller 44 determines that the ID code has been changed. That is, the controller 44 determines that the tire 20 having the transponder 30 has been changed. Specifically, the controller 44 determines that a new tire 20 has been attached to the vehicle 10. Alternatively, the controller 44 determines that the mounting position of the tire 20 with respect to the vehicle 10 has been changed. The controller 44 stores the changed ID code in the internal memory of the controller 44. As a result, the changed ID code is newly registered in the internal memory of the controller 44 (S7).

In the case where the transponder ID codes do not match with one another the second predetermined number of times or more in step S6, on the other hand, the controller 44 executes other processes (S8). One of the other processes possible may be a process which does not change the registered ID code considering that the transponder ID code has not been changed. In this case, the registered ID code is not changed and the ID code registered at that time remains as it is until the key switch 70 is set to on once again.

The transceiver 40 of the tire status monitoring apparatus 1 according to this embodiment has the following advantages.

(1) In the case where the key switch 70 of the vehicle 10 is set to on, the transceiver 40 transmits a request signal to the transponders 30 at predetermined time intervals. In response to the request signal, the controller 44 of the transceiver 40 determines whether the transponder ID code sent from the transponder 30 matches with an ID code registered in the controller 44. In the case where the two ID codes do not match with each other and the transponder ID codes received by the first predetermined number of times match with one another the second predetermined number of times or more, the controller 44 determines that the ID code has been changed. In this case, the controller 44 determines that the tire 20 having the transponder 30 has been changed. The controller 44 stores the changed ID code into the internal memory, e.g., RAM. As a result, the changed ID code is registered in the internal memory of the controller 44. Based on the ID code, therefore, the sender transponder 30 is specified. Even if the tire 20 has been changed, therefore, it is possible to specify the mounting position of the tire 20 and it is unnecessary to carry out the initial registration work for the ID code.

(2) Only when the key switch 70 of the vehicle 10 is set to on, the controller 44 of the transceiver 40 determines whether an ID code has been changed or not. Therefore, the transceiver 40 can efficiently register the ID code into the internal memory of the controller 44, e.g., RAM. That is, in the case where the controller 44 receives transponder data from the transponder 30 while the vehicle 10 is stopped or is running, the controller 44 need not make a determination on the ID code nor perform registration again. This can reduce the burden of the controller 44.

(3) When the transponder ID code matches with a registered ID code, the transceiver 40 terminates the process without overwriting the registered ID code. Even if the ID codes match with each other, therefore, the burden of the controller 44 can be relieved.

(4) The transceiver 40 determines whether the ID code has been changed or not in accordance with the ON signal from the key switch 70 of the vehicle 10. Therefore, no new signal is needed to determine if the ID code has been changed. That is, the transceiver 40 determines if the ID code has been changed by effectively using the existing activation signal. This can permit the transceiver 40 to be easily attached to the vehicle 10.

It should be apparent to those skilled in the art that the present invention may be embodied in many other specific forms without departing from the spirit or scope of the invention. Particularly, it should be understood that the invention may be embodied in the following forms.

The above-described embodiment may be adapted to a tire status monitoring apparatus that includes a plurality of transmitters which are provided on the respective tires 20, have batteries, measure the statuses of the associated tires 20 and transmit data indicating the statuses of the tires 20 acquired in the measurement, and a receiver which receives data from those transmitters.

The transceiver 40 may have a single common antenna 41 with respect to the four transponders 30, or may have two antennae 41 respectively provided at the front portion and rear portion of the vehicle 10.

The drive source may be a hybrid engine comprised of, for example, an engine and a motor, or may be a motor.

The transponder 30 may have a temperature sensor which measures the temperature inside the associated tire 20 so that temperature data in the tire 20 is transmitted to the transceiver 40.

The air pressure data may be data specifically indicating the value of the air pressure, or data simply indicating whether the air pressure lies within an allowable range or not.

In the case where the transponder ID code does not match with a registered ID code, the controller 44 may determine that the transponder ID code has been changed and the tire 20 associated with the changed transponder ID code has been changed.

The vehicle may be a two-wheel bicycle or motorcycle, a multi-wheel bus or tractor, or an industrial vehicle or the like (e.g., a forklift) provided with tires 20. In case where the transponders 30 are provided on the tires of a tractor, the transceiver 40 and the display 50 are placed on the tractor.

The transceiver 40 may be activated in accordance with the ON action of the key switch 70 of the vehicle 10. In this case, after the key switch 70 is set to on, the transceiver 40 transmits a request signal to the transponders 30 and executes the ID code determining process of the above-described embodiment.

Therefore, the present examples and embodiments are to be considered as illustrative and not restrictive and the invention is not to be limited to the details given herein, but may be modified within the scope and equivalence of the appended claims.

What is claimed is:

1. A receiver for a tire status monitoring apparatus that monitors statuses of a plurality of tires provided on a vehicle and includes a plurality of transmitters, provided on the tires respectively, for transmitting data indicating statuses of the respective tires, the data including an identification code to identify each tire, the receiver being supplied with an activation signal to activate a drive source of the vehicle, the receiver comprising:

a reception unit which receives the data from the transmitters; and a control circuit connected to the reception unit, wherein upon detection of the activation signal, the control circuit collates the identification code included in the data and specifies, based on the identification code, each transmitter which has transmitted the data, wherein the control circuit has an identification code registered beforehand, determines whether or not the identification code included in the data matches with the registered identification code, and determines whether or not those identification codes included in the data received by a first predetermined number of times match with one another a second predetermined number of times less than the first predetermined number of times or more when it is determined that those two identification codes do not match with each other, and determines that that tire which is associated with the identification code included in the data has been changed when it is decided that there have been such matches.

2. The receiver according to claim 1, wherein the reception unit transmits a request signal to each individual transmitter and receives the data in response to the request signal from each transmitter.

3. The receiver according to claim 1, wherein when it is determined that a tire has been changed, the control circuit updates the registered identification code with the identification code included in the received data.

4. The receiver according to claim 1, wherein the vehicle has a key cylinder including a key switch which generates the activation signal, and the control circuit receives the activation signal from the key cylinder when the key switch is set to on.

5. A tire status monitoring apparatus for monitoring statuses of a plurality of tires provided on a vehicle, the tire status monitoring apparatus comprising:

a plurality of transmitters provided on the tires respectively, which detect statuses of the associated tires and transmit data indicating the detected statuses of the tires, the data including an identification code to identify each tire; and a receiver provided on the vehicle, which receives the data from the plurality of transmitters and is supplied with an activation signal for activating a drive source of the vehicle, wherein the receiver includes a control circuit, which, upon detection of the activation signal, collates the identification code included in the data and specifies, based on the identification code, each transmitter which has transmitted the data, wherein the control circuit has an identification code registered beforehand, determines whether or not the identification code included in the data matches with the registered identification code, determines whether or not those identification codes included in the data received by a first predetermined number of times match with one another a second predetermined number of times less than the first predetermined number of times or more when it is determined that those two identification codes do not match with each other, and determines that that tire which is associated with the identification code included in the data has been changed when it is decided that there have been such matches.

6. The tire status monitoring apparatus according to claim 5, wherein the receiver transmits a request signal to each transmitter and receives the data in response to the request signal from each transmitter.

7. The tire status monitoring apparatus according to claim 6, wherein the plurality of transmitters generate power induced by the request signal and transmit the data using the generated power.

8. The tire status monitoring apparatus according to claim 5, wherein when it is determined tat a tire has been changed, the control circuit updates the registered identification code with the identification code included in the received data.

9. The tire status monitoring apparatus according to claim 5, wherein the vehicle has a key cylinder including a key switch which generates the activation signal, and the control circuit receives the activation signal from the key cylinder when the key switch is set to on.

10. A method of monitoring statuses of a plurality of tires provided on a vehicle and including a plurality of transmitters which generate data indicating statuses of the respective tires, the vehicle including a receiver which receives the data from the transmitters, the data including an identification code to identify each tire, the method comprising the steps of:

detecting an activation signal for activating a drive source of the vehicle;

transmitting a request signal for generating the data and transmitting the data to the receiver to the plurality of transmitters, when the activation signal is detected;

receiving the data from the plurality of transmitters;

collating the identification code included in the data; and specifying each transmitter which has transmitted the data, based on the identification code, wherein the receiver has an identification code registered beforehand, and the collation step includes the steps of:

determining whether the identification code included in the data matches with the registered identification code or not;

receiving the data by a first predetermined number of times when it is determined that the two identification codes do not match with each other;

determining whether or not those identification codes which are included in the data received by the first predetermined number of times do not match with one another a second predetermined number of times less than the first predetermined number of times or more; and determining that that tire which is associated with the identification code has been changed when it is determined that the identification codes match with one another the second predetermined number of times or more.

11. The method according to claim 10, wherein the collation step further includes the step of updating the registered identification code with the identification code included in the received data when it is determined that a tire has been changed.

12. The method according to claim 10, wherein the vehicle has a key cylinder including a key switch which generates the activation signal, and the step of detecting the activation signal detects the activation signal when the key switch is set to on.

* * * * *

UNITED STATES PATENT AND TRADEMARK OFFICE
CERTIFICATE OF CORRECTION

PATENT NO. : 6,999,861 B2
DATED : February 14, 2006
INVENTOR(S) : Michiya Katou

It is certified that error appears in the above-identified patent and that said Letters Patent is hereby corrected as shown below:

Column 7,
Line 49, delete "tat", and insert -- that --.

Signed and Sealed this

Twenty-third Day of May, 2006

JON W. DUDAS
*Director of the United States Patent and Trademark Office*